United States Patent
Lier et al.

(10) Patent No.: US 8,820,921 B1
(45) Date of Patent: Sep. 2, 2014

(54) ASSEMBLY FOR RETAINING EYEGLASSES ON THE HEAD OF A USER IN MULTIPLE POSITIONS

(71) Applicants: Erik Lier, Newtown, PA (US); Lars Langli, Surnadal (NO)

(72) Inventors: Erik Lier, Newtown, PA (US); Lars Langli, Surnadal (NO)

( * ) Notice: Subject to any disclaimer, the term of this patent is extended or adjusted under 35 U.S.C. 154(b) by 0 days.

(21) Appl. No.: 13/845,064

(22) Filed: Mar. 17, 2013

Related U.S. Application Data (63) Continuation-in-part of application No. 12/982,821, filed on Dec. 30, 2010, now abandoned.

(51) Int. Cl.
*G02C 5/14* (2006.01)

(52) U.S. Cl.
USPC .......................................... 351/123; 351/120

(58) Field of Classification Search
USPC ......... 351/123, 120, 118, 119, 156, 157, 158, 351/111; 128/864, 866; 2/12, 13, 426, 438, 2/448, 456
See application file for complete search history.

(56) References Cited

U.S. PATENT DOCUMENTS

| | | | | |
|---|---|---|---|---|
| 1,636,740 A | * | 7/1927 | Hickey | 351/123 |
| 1,833,792 A | * | 11/1931 | Pfaus et al. | 351/123 |
| 4,712,893 A | * | 12/1987 | Anger | 351/123 |
| 4,863,257 A | * | 9/1989 | Morgan | 351/123 |
| 4,925,291 A | * | 5/1990 | Anger et al. | 351/123 |
| 5,162,823 A | * | 11/1992 | Goldstein | 351/123 |
| 5,302,977 A | * | 4/1994 | Markovitz et al. | 351/114 |
| 5,859,684 A | * | 1/1999 | Rittmann | 351/111 |
| 7,407,282 B1 | | 8/2008 | Chen | |
| 7,524,056 B2 | | 4/2009 | Bovee | |

* cited by examiner

*Primary Examiner* — Hung Dang
(74) *Attorney, Agent, or Firm* — LaMorte & Associates, P.C.

(57) ABSTRACT

A system and method for connecting eyeglasses or a similar device to the ear of a person, while enabling the device to be selectively raised and lowered as needed. A set of ear anchors attach to a wearer's head. Each of the ear anchors has a pinna loop that is sized to encircle the pinna of the ear. An arm is supported by each of the ear anchors. Each arm extends forward of the ear anchors toward the eyes of the wearer. The temple elements of the eyeglasses interconnect with the arms using connectors. The connectors can be formed into the structure of the arms or can be separate elements that mechanically attach to the arms. The connectors engage the temple elements yet enable the temple elements to be selectively manipulated between a functional position and a raised position.

19 Claims, 7 Drawing Sheets

ASSEMBLY FOR RETAINING EYEGLASSES ON THE HEAD OF A USER IN MULTIPLE POSITIONS

RELATED APPLICATIONS

This application is a continuation-in-part of U.S. patent application Ser. No. 12/982,821 filed Dec. 30, 2010, now abandoned entitled Retainer For Eyeglasses With Adjustable Position.

BACKGROUND OF THE INVENTION

1. Field of the Invention

In general, the present invention relates to devices that are used to hold eyeglass frames to the head of a wearer. More particularly, the present invention relates to devices that enable eyeglass frames to be raised and lowered without removing the eyeglass frames from the head.

2. Prior Art Description

Eyeglasses are worn by many people for many reasons. For example, protective eyeglasses are often worn by workers to prevent flying debris from contacting the eye. Sunglasses are worn by people seeking protection from the glare of the sun. Corrective eyeglasses are worn by people who need lenses in order to see objects clearly. Regardless of the reason why eyeglasses are worn, most people do not need the glasses at all times. For example, a person who needs eyeglasses to read small print may not need those glasses when walking around. Likewise, people who need to wear sunglasses do not need those glasses when the sun is shaded.

In life, many people simply raise eyeglasses onto the tops of their heads when those eyeglasses are not needed. In this manner, the eyeglasses can be quickly and easily dropped into place when needed. However, when eyeglasses are raised to the top of the head, the eyeglasses lose the support of the wearer's nose. The eyeglasses therefore may become loose on the head and can easily fall off the head.

In the prior art, eyeglass assemblies have been designed that enable eyeglasses to be raised on the head while still maintaining a firm interconnection between the wearer's head and the eyeglasses. This is often done by placing hinges in the temple elements of the eyeglasses. The hinges enable the eyeglasses to be raised and lowered without adversely affecting the manner in which the eyeglasses secure around the ears of the user. Such prior art is exemplified by U.S. Pat. No. 7,524,056 to Bovee, entitled Eyeglasses With Mid-Temple Hinge; and U.S. Pat. No. 7,407,282 to Chen, entitled Eyeglass Temple Assembly.

The obvious problem with such prior art eyeglass designs is that the design requires a specialized frame that contains the hinge elements. In this manner, a person's regular reading glasses, sunglasses and/or safety glasses cannot be worn. Rather, new specialized glasses must be manufactured. This can be a large inconvenience and expense to the wearer.

Another problem with such prior art designs is that the eyeglasses are still not firmly secured to the wearer's head when the lenses of the eyeglasses are raised. In the previously cited U.S. Pat. No. 7,407,282 to Chen, this problem is addressed by securing the eyeglass frames to the ear canal with earplugs. However, this adversely affects the ability of a person to hear and is therefore highly undesirable.

A need therefore exists for a system and method that enables eyeglasses to be securely worn on the head while enabling the lenses of the eyeglasses to be selectively raised to the top of the head. A need also exists for such a system that does not block the wearer's ear canal and inhibit hearing. Lastly, a system is needed that secures eyeglasses to the head, enables the eyeglasses to be raised and lowered, and works with standard eyeglass frames. These needs are met by the present invention as described and claimed below.

SUMMARY OF THE INVENTION

The present invention is a system and method for connecting eyeglasses to the ear of a person, while enabling the eyeglasses to be selectively raised and lowered as needed. The system utilizes a set of ear anchors, having a left ear anchor for the left ear and a right ear anchor for the right ear. Each of the ear anchors has a pinna ring that is sized to encircle the pinna of the ear. An arm is supported by each of the ear anchors. Each arm extends forward of the ear anchors toward the eyes of the wearer.

The temple elements of the eyeglasses interconnect with the arms using connectors. The connectors can be formed into the structure of the arms or can be separate elements that mechanically attach to the arms. The connectors engage the temple elements yet enable the temple elements to be selectively manipulated between a functional position and a raised position. In the functional position, the eyeglasses are held in front of the eyes of the wearer. In the raised position, the eyeglasses are supported in a raise position above the eyes of the wearer.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention eyeglass retention assembly can be embodied in many ways, three exemplary embodiments are illustrated and described. These embodiments are selected in order to set forth some of the best modes contemplated for the invention. The illustrated embodiments, however, are merely exemplary and should not be considered a limitation when interpreting the scope of the appended claims.

Figure 1:
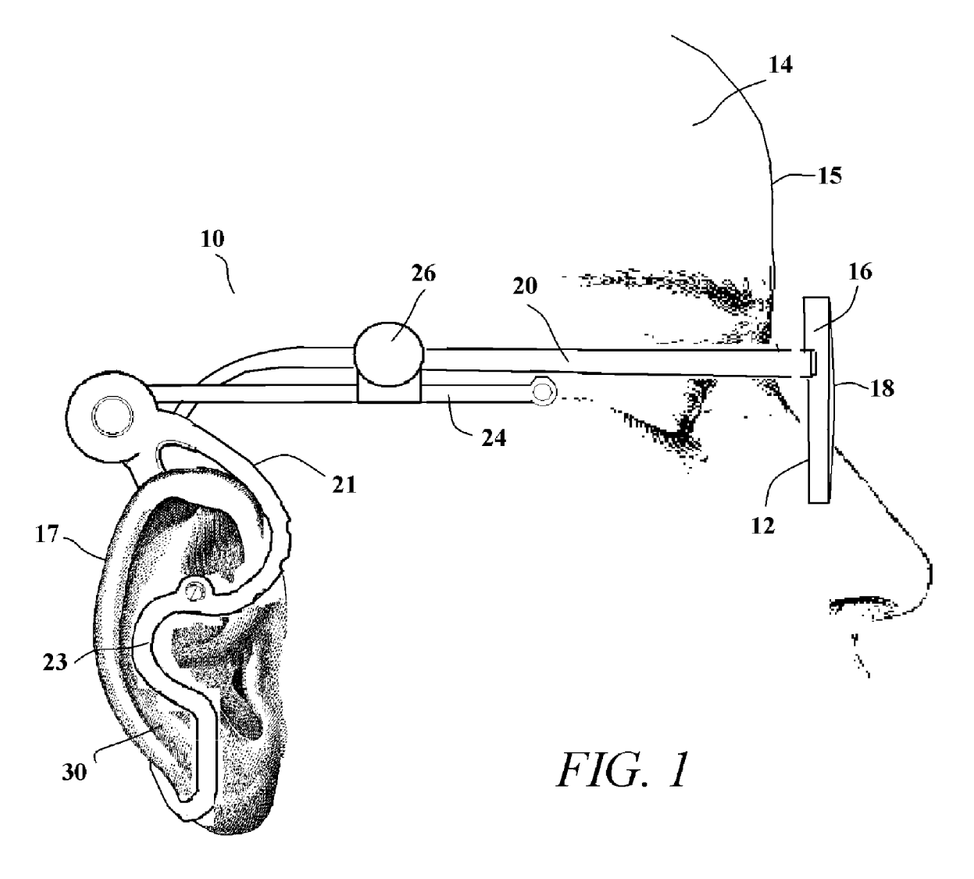
FIG. 1 is a side view of a head wearing an exemplary embodiment of the eyeglass retention system in a functional position where the eyeglasses are positioned in front of the eyes.
Figure 2:
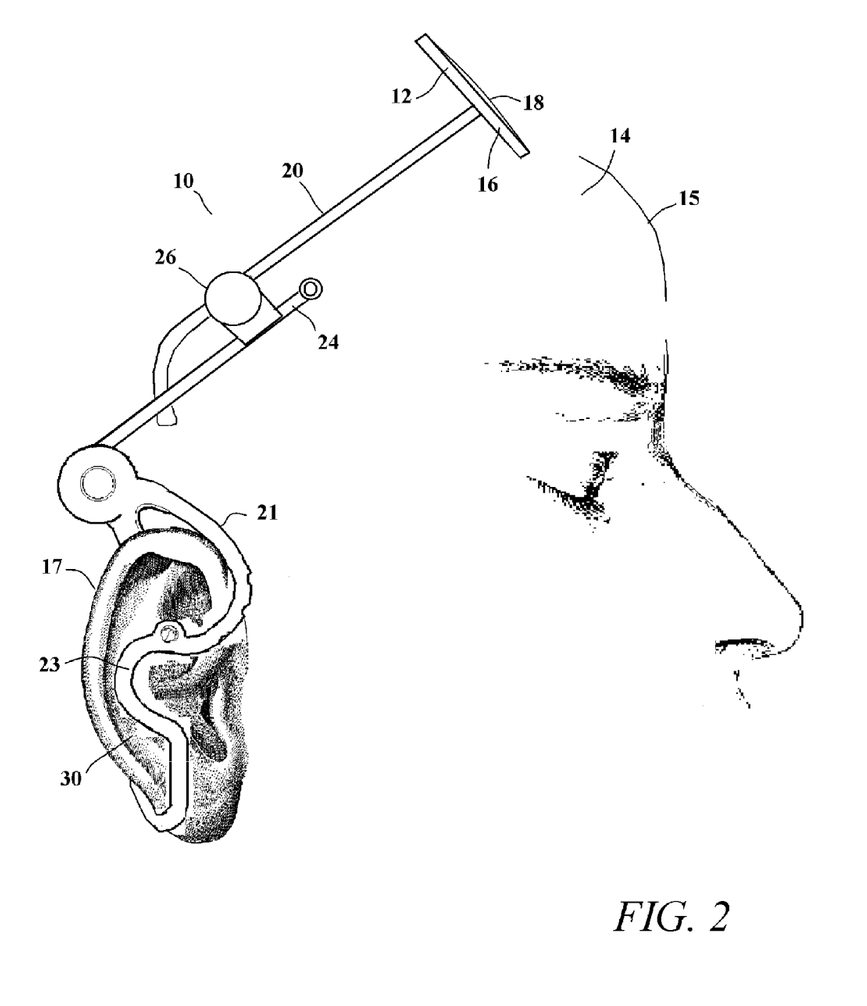
FIG. 2 is a side view of a head wearing an exemplary embodiment of the eyeglass retention system in a raised position where the eyeglasses are positioned above the eyes.

Referring to both FIG. 1 and FIG. 2, an eyeglass retention assembly 10 is shown that is used to join a standard set of eyeglasses 12 to the head 14 of a wearer 15. The eyeglasses 12 can be corrective glasses, sunglasses, protective glasses, and/or electronic glasses, such as electronic 3D viewer glasses or glasses with heads-up displays. The eyeglasses 12 have frames 16 that hold one or more lenses 18. The frames 16 have temple elements 20 that are sized and shaped to pass along the sides of the head 14 and engage the ears 17 of the wearer 15. The eyeglass retention assembly 10 enables the eyeglasses 12 to be selectively altered in wearing position, between a functional position and a raised position. The functional position is shown in FIG. 1, wherein the eyeglasses 12 are positioned so that the lenses 18 of the eyeglasses 12 are directly in front of the head 14. The raised position is shown in FIG. 2, wherein the eyeglasses 12 are positioned so that the lenses 18 are raised high on the head 14, above the eyes.

Figure 3:
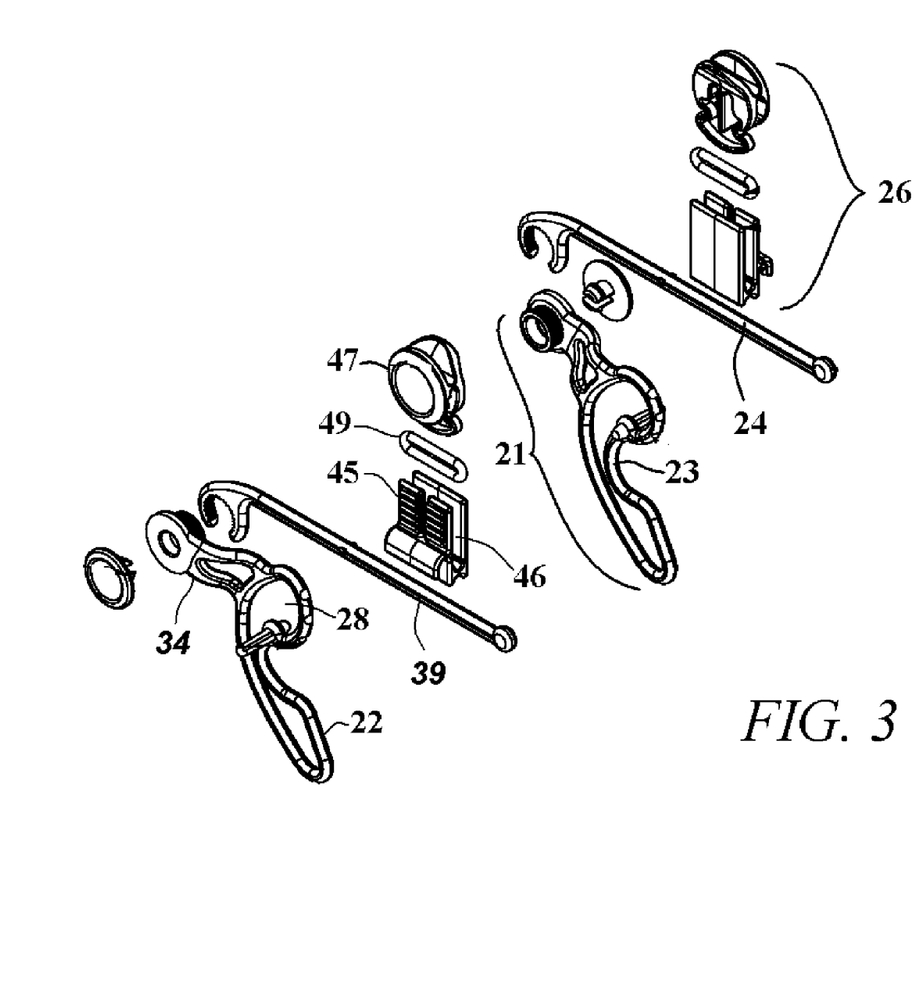
FIG. 3 is an exploded perspective view of the exemplary embodiment of FIGS. 1 and 2.
Figure 4:
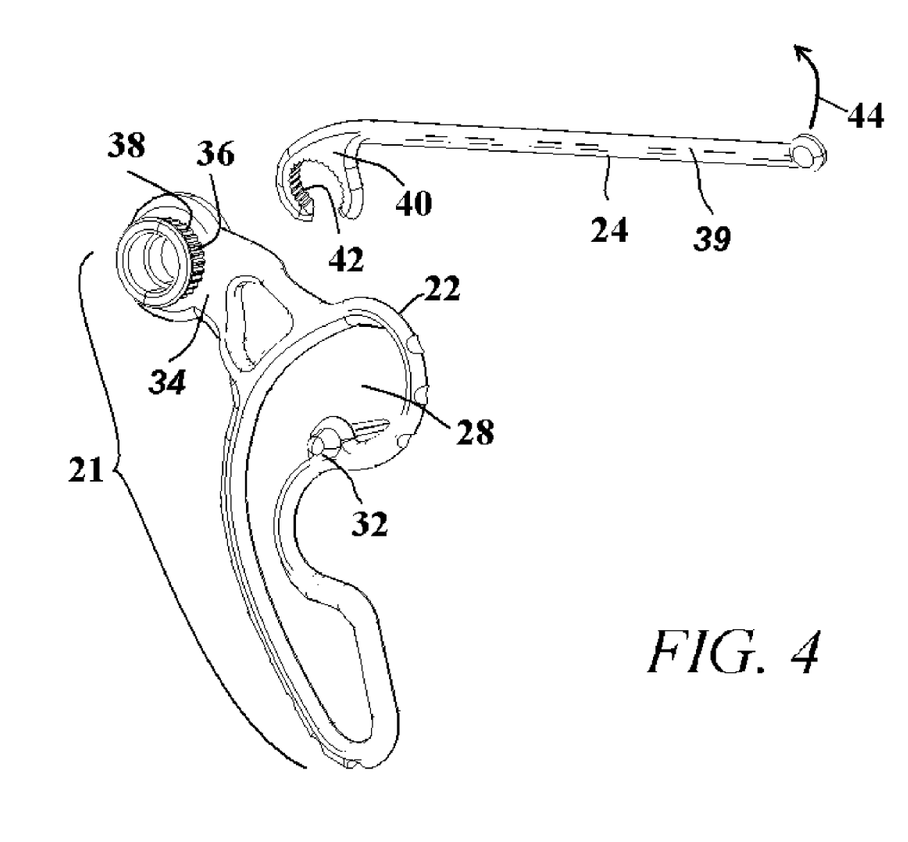
FIG. 4 is an enlarged perspective view of two of the main components of the exemplary embodiment.

In the shown embodiment, the eyeglass retention assembly 10 includes ear anchors 21, slide arms 24 and positioning clips 26 for both the left and right sides of the head 14. Referring to FIGS. 3 and 4 in conjunction with FIGS. 1 and 2, it can be seen that each of the ear anchors 21 include a pinna ring 22. The pinna ring 22 is a closed loop structure that defines an open interior region 28. The interior region 28 is sized and shaped to pass around the pinna 30 of the ear 17. Consequently, when worn, the pinna ring 22 will partially encircle the pinna 30 of the ear 17 so that the pinna 30 protrudes through the interior region 28 of the pinna ring 22.

The pinna ring 22 can be formed as a continuous loop. However, a break in the pinna ring 22 can be formed to increase the flexibility of the pinna ring 22 and to increase the ease of installation about the ear. The pinna ring 22 has a rear that is convex and a front that is concave. This provides the pinna ring 22 with a generally C-shape. Furthermore, a recess curve 23 is formed into the pinna ring 22. When worn about the pinna 30 of the ear 17, the recess curve 23 passes around the ear canal of the ear so that the pinna ring 22 does not block or otherwise obstruct the ear canal. Accordingly, the wearer's hearing is not adversely affected by the presence of the pinna ring 22.

The ear anchors 21 also include a post protrusion 32 extending inwardly from the pinna ring 22. The post protrusion 32 extends into one of the interior folds of the ear, such as the crus of helix or the cymba conchae. In this manner, the post projection 32 helps prevent the pinna ring 22 from inadvertently rotating when placed around the pinna 30 of the ear 17. The post protrusion 32 may also extend outwardly from the pinna ring 22 to provide a surface to grip and manipulate the ear anchor 21.

A support structure 34 extends upwardly from the pinna ring 22. The support structure 34 lay in the same general plane as does the pinna ring 22. The support structure 34 supports a spline 36. The spline 36 extends laterally from the support structure 34. As such, the spline 36 extends at a perpendicular to the general plane of both the support structure 34 and the pinna ring 22. The spline 36 has a cylindrical exterior around which are formed a multitude of parallel spline teeth 38.

The slide arm 24 has a straight shaft 39 that is terminated at one end with a C-shaped connector 40. The interior of the C-shaped connector 40 contains teeth 42 that have the same pitch and size as the spline teeth 38 on the spline 36. The C-shaped connector 40 engages the spline 36, wherein the teeth 42 on the C-shaped connector 40 intermesh with the spline teeth 38. This creates a mechanical interconnection between the ear anchor 21 and the slide arm 24. The slide arm 24 therefore extends from the ear anchor 21 as a cantilever. However, the slide arm 24 can be rotated about the spline 36 in the direction of arrow 44. When a force is applied to the slide arm 24, the C-shaped connector 40 can be caused to skip teeth on the spline 36 and rotate about the spline 36. As soon as the moving force is removed, the C-shaped connector 40 again mechanically engages the spline 36. It will therefore be understood that the slide arm 24 can be selectively raised and lowered to a variety of positions relative the ear anchor 21. The number of possible adjustment positions is determined by the number and pitch of both the spline teeth 38 on the spline 36 and the teeth 42 within the C-shaped connector 40.

The positioning clip 26 connects to the slide arm 24 and is free to move back and forth along the length of the slide arm 24. The positioning clip 26 has a clip base 45 that mechanically engages the slide arm 24. The clip base 45 embodies a U-shaped depression 46. The U-shaped depression 46 is sized to receive the temple elements 20 of most eyeglasses. The temple element 20 is locked into the U-shaped depression 46 with a clip head 47 and an O-ring 49. In this manner, the overall positioning clip 26 can be adjusted to temple elements of different shapes.

To utilize the eyeglass retention assembly 10, the wearer 15 starts with two ear anchors 21, two slide arms 24 and two positioning clips 26. The slide arms 24 are attached to the ear anchors 21. The positioning clips 26 are attached to the slide arms 24. The pinna rings 22 are attached to the ears 17 of the wearer 15. This positions the slide arms 24 and positioning clips 26 along the temples of the wearer 15. The wearer 15 then connects the temple elements 20 of his/her eyeglasses 12 to the positioning clips 26. The positioning clips 26 are moved along the slide arms 24 to a comfortable position.

To raise the eyeglasses 12 to the raised position of FIG. 2, the wearer 15 simply rotates the eyeglasses 12, the positioning clips 26 and the slide arms 24 as a unit. The slide arms 24 rotate relative the ear anchors 21 while retaining the eyeglasses 12, slide arms 24 and positioning clips 26 in the raised position. When the eyeglasses 12 are needed, the eyeglasses 12, slide arms 24 and positioning clips 26 are lowered as a unit back to the functional position shown in FIG. 1.

Figure 5:
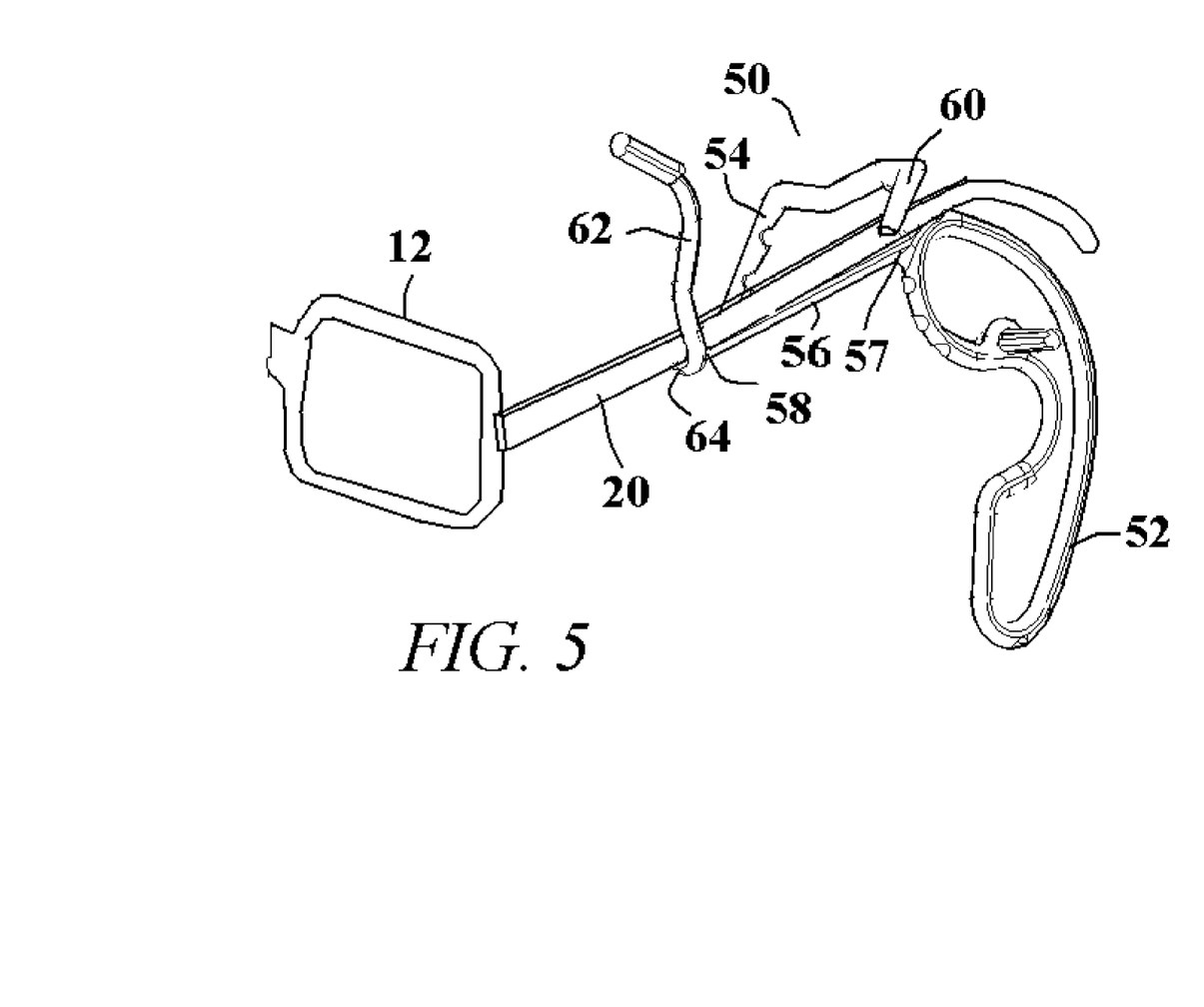
FIG. 5 shows an alternate embodiment of the present invention shown with eyeglasses held in a functional position.
Figure 6:
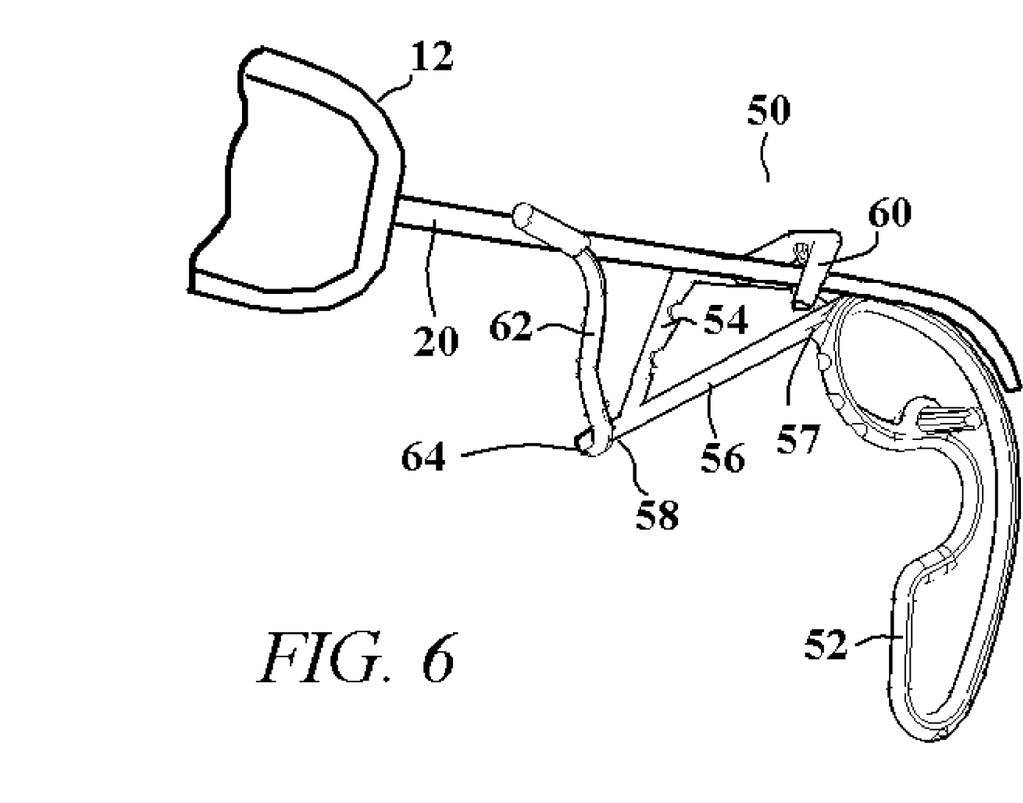
FIG. 6 shows the alternate embodiment of FIG. 5 shown with eyeglasses held in a raised position.

Referring now to FIG. 5 and FIG. 6, an alternate embodiment of the present invention is shown. In this embodiment, the present invention is molded as a single piece into an eyeglass retention device 50.

The eyeglass retention device 50 has a pinna ring 52 that serves as an ear anchor. The pinna ring 52 attaches to the ear in the same manner as was previously described. A cantilever anchor structure 54 is attached to the pinna ring 52. The cantilever anchor structure 54 includes a forward arm element 56. The forward arm element 56 and the pinna ring 52 lay in the same general vertical plane. The forward arm element 56 has a first end 57 that is attached to the pinna ring 52 and a second end 58 that extends away from the pinna ring 52.

A lateral hook 60 extends inwardly from the forward arm element 56, proximate the first end 57 of the forward arm element 56. A skewed finger 62 leans inwardly from the forward arm element 56 at the second end 58 of the forward arm element 56. The skewed finger 62 first extends inwardly and then extends upwardly to form a small rest 64 proximate the second end 58 of the forward arm element 56.

A wearer attaches an eyeglass retention device 50 to each ear by placing the pinna ring 52 around the pinna of each ear. Eyeglasses 12 are the set into each cantilever anchor structure 54. The temple element 20 of the eyeglasses 12 balances upon the rest 64 near the second end 58 of the forward arm element 56. The free end of the temple element 20 passes under the lateral hook 60, therein supporting the eyeglasses 12 with a cantilever action. The eyeglasses 12 can then be used in the normal manner, as is illustrated in FIG. 5. However, to raise the eyeglasses 12, the eyeglasses 12 are rotated upwardly. The temple elements 20 press against the skewed finger 62. The lateral hook 60 keeps the rear of the temple elements 20 down against the tops of the ears. The temple elements 20 can therefore be retained in the raised position by spring action from the skewed finger 62. This is shown in FIG. 6. To lower the eyeglasses 12, the wearer need only pull the eyeglasses 12 down with enough force to overcome the spring action.

In both exemplary embodiments of the present invention that have been presented, the eyeglasses can be both raised and lowered. Furthermore, when the eyeglasses are in the raised position, the eyeglasses are still firmly secured to the ears of the wearing using the described pinna ring technology. The result is an assembly that can be used to raise and lower any ordinary eyeglasses without modification to those eyeglasses.

Figure 7:
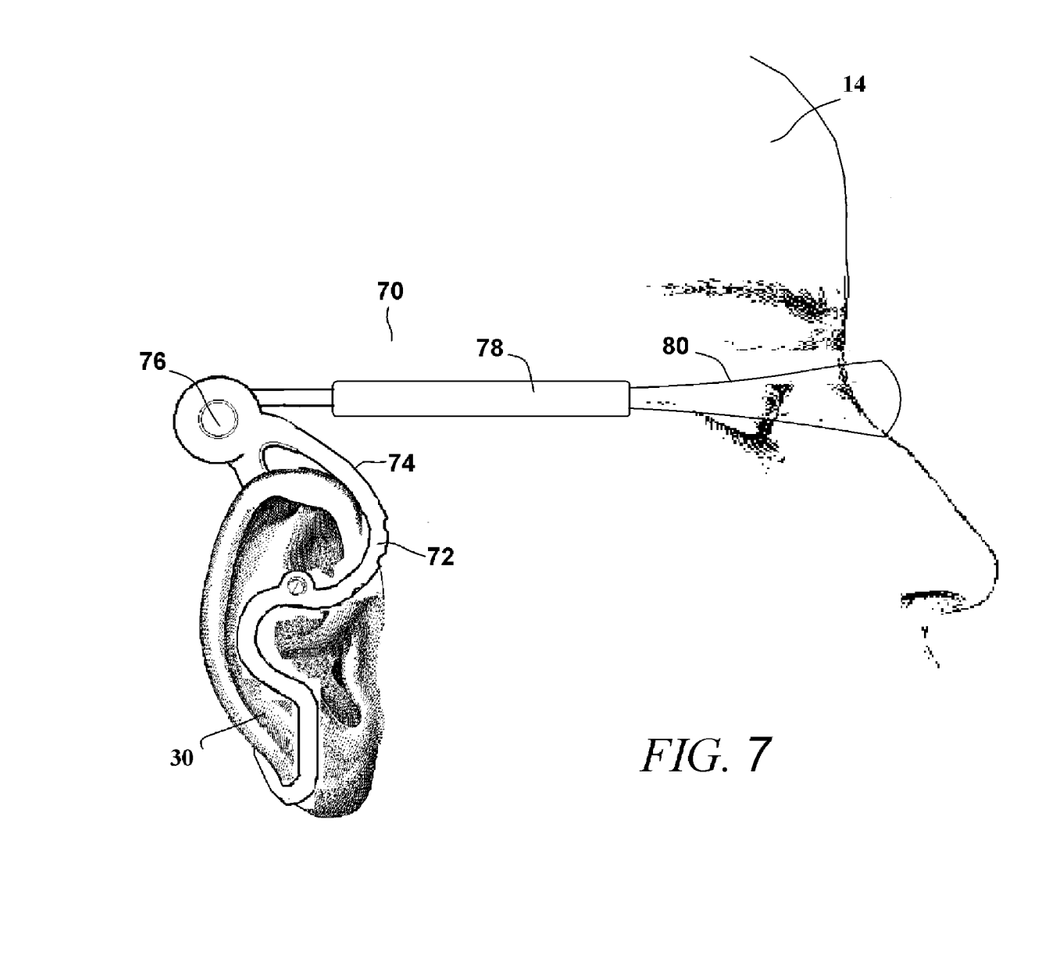
FIG. 7 shows a second alternate embodiment of the present invention.

Referring to FIG. 7 another embodiment of the present invention is shown. In this embodiment, the present invention is molded as a mount for an electronic device 70. The electronic device 70 can be internet glasses, 3D glasses, a phone headset, a microphone, or any other such device that is typically mounted to the head. Furthermore, the electronic device 70 may only attached to one ear.

The electronic device 70 has a pinna ring 72 that serves as an ear anchor. The pinna ring 72 attaches to the pinna 30 of the ear in the same manner as was previously described. A support structure 74 extends above the pinna ring 72. The support structure 74 supports a spline joint 76 of the type previously described.

A support arm 76 extends from the spline joint 76. The support arm 76 supports an electronic module 78. The electronics module contains the battery and circuitry needed to operate the electronic device 80. The spline joint 76 enables the electronics module 78 and the electronic device 80 to be raised and lowered as desired by the wearer.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. For a wearer who has a head with two ears, wherein each of the ears has a pinna that protrudes from the head, an assembly comprising:
   eyeglasses having temple elements and at least one lens;
   a set of ear anchors, wherein each of said ear anchors has a pinna ring that is sized to encircle each pinna on the head;
   a set of arms, wherein said arms extends forward from said ear anchor;
   connectors, supported by said arms, wherein said connectors support and retain said temple elements in both a functional position, where said at least one lens is positioned in front of the head, and in a raised position, where said at least one lens is positioned higher than in said functional position.

2. The assembly according to claim 1, wherein said connectors are selectively adjustable in position along each of said set of arms.

3. The assembly according to claim 1, wherein said set of arms are attached to said ear anchors at hinge joints that enable said set of arms to rotate relative said ear anchors.

4. The assembly according to claim 1, wherein said connectors include mechanical clips that are attached to said set of arms.

5. The assembly according to claim 1, wherein said connectors include lateral hooks that extend from said set of arms.

6. The assembly according to claim 5, wherein said connectors include fingers that extend from said set of arms and press against said temple elements when said temple elements are in said raised position.

7. The assembly according to claim 5, wherein said set of arms, said lateral hooks and said fingers are integrally molded to said set of ear anchors.

8. An assembly for attaching eyeglass frames to an ear, comprising:
   an ear anchor having a pinna ring;
   an arm supported by said ear anchor that extends forward from said ear anchor;
   a connector for receiving and retaining part of said eyeglass frames, wherein said connector is supported by said arm and is selectively adjustable in position along said arm.

9. The assembly according to claim 8, wherein said arm is attached to said ear anchor at a hinge joint that enables said arm to rotate about said hinge joint relative said ear anchor.

10. The assembly according to claim 9, wherein said hinge joint includes a spline that extends laterally from said ear anchor.

11. The assembly according to claim 10 wherein said hinge joint includes teeth that are affixed to said arm and intermesh with said spline at said hinge joint.

12. The assembly according to claim 8, further including a post protrusion that extends inwardly from said pinna ring.

13. The assembly according to claim 8, wherein said pinna ring is a closed ring structure that defines an interior region, wherein said interior region is sized and shaped to enable an ear to extend therethrough.

14. An ear anchor device for attachment to a human ear having a pinna, interior folds and an ear canal, said ear anchor comprising:
   a pinna loop that defines the periphery of an open interior area, wherein said open interior area is sized to enable most of an ear pinna to pass therethrough;
   a post extending inwardly from a point on said pinna loop, wherein said post extends into one of said interior folds of said ear when said pinna loop is position around at least part of said pinna.

15. The device according to claim 14, wherein said pinna loop has a recessed area that curves said pinna loop away from the ear canal so as not to obstruct the ear canal when said pinna loop is position around at least part of said pinna.

16. The device according to claim 15, wherein said pinna loop extends in a generally common plane and said post extends at a perpendicular to said common plane.

17. The device according to claim 16, further including a positioning post extending outwardly away from said pinna loop in a direction perpendicular to said common plane, wherein said positioning post provides a structure to grasp and manipulate said ear anchor device.

18. The device according to claim 16, further including a support structure that extends above said pinna loop in said common plane.

19. The device according to claim 18, further including a pivot joint on said support structure that joins said support structure to an arm element, wherein arm element is free to rotate about said pivot joint through a predetermined range.

* * * * *